US009393765B2

(12) United States Patent
Pridemore et al.

(10) Patent No.: US 9,393,765 B2
(45) Date of Patent: Jul. 19, 2016

(54) MITER CLAMP

(71) Applicants: Kevin D Pridemore, Nixa, MO (US); Larry L. Livingston, Jr., Pilot Hill, CA (US)

(72) Inventors: Kevin D Pridemore, Nixa, MO (US); Larry L. Livingston, Jr., Pilot Hill, CA (US)

(73) Assignee: Imni Cubed, Inc., Placerville, CA (US)

( * ) Notice: Subject to any disclaimer, the term of this patent is extended or adjusted under 35 U.S.C. 154(b) by 202 days.

(21) Appl. No.: 14/464,138

(22) Filed: Aug. 20, 2014

(65) Prior Publication Data

US 2015/0352693 A1     Dec. 10, 2015

Related U.S. Application Data

(60) Provisional application No. 62/008,887, filed on Jun. 6, 2014.

(51) Int. Cl.
| | |
|---|---|
| *B25B 5/10* | (2006.01) |
| *B32B 37/12* | (2006.01) |
| *B32B 37/10* | (2006.01) |
| *B32B 37/18* | (2006.01) |
| *B25B 5/08* | (2006.01) |
| *B25B 5/14* | (2006.01) |
| *B25B 5/06* | (2006.01) |

(52) U.S. Cl.
CPC ............... *B32B 37/10* (2013.01); *B25B 5/085* (2013.01); *B25B 5/142* (2013.01); *B32B 37/1284* (2013.01); *B32B 37/18* (2013.01); *B25B 5/06* (2013.01); *B25B 5/10* (2013.01); *B25B 5/102* (2013.01); *Y10T 156/10* (2015.01); *Y10T 156/1744* (2015.01)

(58) Field of Classification Search
CPC .... B32B 37/10; B32B 37/1284; B32B 37/18; Y10T 156/1744; B25B 1/02; B25B 1/06; B25B 1/10; B25B 1/24; B25B 1/2405; B25B 1/2415; B25B 1/2421; B25B 5/02; B25B 5/06; B25B 5/10; B25B 5/102; B25B 5/104; B25B 5/106
USPC ................................................ 269/41; 24/461
See application file for complete search history.

(56) References Cited

U.S. PATENT DOCUMENTS

| 1,474,119 | A | * | 11/1923 | Robertson | ............... | B25B 5/102 |
|---|---|---|---|---|---|---|
| | | | | | | 269/249 |
| 8,226,074 | B1 | * | 7/2012 | Hughey | ................... | B25B 5/003 |
| | | | | | | 269/155 |
| 2014/0001691 | A1 | * | 1/2014 | Royal | ...................... | B25B 5/003 |
| | | | | | | 269/45 |

* cited by examiner

*Primary Examiner* — Carson Gross
(74) *Attorney, Agent, or Firm* — Manuel de la Cerra

(57) ABSTRACT

A miter clamp is provided which includes a paddle with a non-slip surface that can be placed on a miter-cut piece of material. The paddle is connected to a channel structure that has disposed therein a shaft assembly, which has connected to it a lower material holding structure that holds a second miter-cut piece of material. The shaft assembly is locked into place by a position lock that is attached to the paddle, with a position lock tab that contacts the shaft assembly and restricts movement of the shaft assembly. The relative position of the shaft assembly to the paddle can be changed such that the first and second miter-cut pieces can be brought in contact with each other. Other structures allowing for the fine movement of the shaft assembly are disclosed.

20 Claims, 15 Drawing Sheets

MITER CLAMP

1.0 CROSS-REFERENCE TO RELATED APPLICATIONS

This application claims priority as a non-provisional of U.S. Patent Application No. 62/088,887, entitled MITER CLAMP filed on Jun. 6, 2014, and that patent application is incorporated herein in its entirety.

2.0 FIELD OF THE INVENTION

This invention relates to clamps. More particularly, this invention relates to clamps used to join two miter edges together so as to let an adhesive set.

3.0 BACKGROUND

The demand for solid surface countertops such as granite, marble, engineered stone, and Corian® has steadily risen over the past decade. As the demand for solid surface countertops, vanities, tub-decks, fireplace mantles and hearths continues to grow, it becomes more imperative for solid-surface fabrication companies to work faster, without sacrificing quality, in order to meet this demand. In working with solid surfaces, it is often desirable to join two or more pieces of material together, especially at the visible edges of countertops. By joining pieces together, it is possible to make the finished countertop appear thicker, and to provide a more substantial edge for the application of more elegant edge treatments. For example, much of the granite on the West Coast of the United States comes in slabs that are only about 20-mm thick. In order to make the countertop appear thicker, a manufacture can laminate a narrow strip of the slab to all visible edges, which makes the slab appear to be twice as thick. Other options are miter cutting the edge of the slab (i.e., a 45-degree cut) and miter cutting a narrow strip of material (known as the drop skirt), and then attaching these two pieces with adhesive. The process of joining material is a regular and necessary task for most solid-surface fabrication companies. Unfortunately, because this industry is still relatively young, the technology and tools used to join these materials are quite crude.

Solid surface material is often sold in slabs, which, in the case of granite, may be up to 9 feet by 6 feet in size, and in some cases, even larger. Solid surfaces may also be sold in tile form. These tiles are often available in standard sizes, such as 12"×12", 16"×16", or 18"×18". It will be appreciated that solid material may be available in a variety of sizes, and may represent either a natural or man-made material.

Standard f-clamps are the most common tool employed by solid surface fabricators for joining two materials along 45 degree mitered cuts. There are many problems associated with using f-clamps, including the time it takes to use them, recurring replacement costs, poor joining quality, and the complications of setting them correctly. For example, when joining two miter-cut pieces, the current state of the art requires that the solid slab be placed finished-side-down and the drop skirt is installed extending vertically and upwardly away from the slab. Adhesive is placed in the seam between the two pieces and sets of clamps are then used to fix the drop skirt's position to the slab, while the adhesive cures. One such clamp system for joining miter-cut pieces is the Integra Mitre System, manufactured by Integra Adhesives, Inc. located in British Columbia, Canada.

The current art, however, has several shortcomings. First, the slab must be flipped with the finish-side-down, prior to installing the drop skirt. For larger pieces, this would require more than one person, thus increasing labor costs. Also, the slab may be damaged from too much handling, especially because the finished side is now in contact with a work surface at the manufacturing plant. As a result, the standard protocol is to flip the drop skirt complex back to the finished-side-up orientation, and then re-polishing areas that were damaged—greatly increasing labor costs. Second, each f-clamp must be tightened to approximately the same torque as all the others. Even small differences in compression may result in a poor adhesion, or in an uneven and unsightly seam. Third, it takes a long time to apply all the f-clamps and often requires more than one person to tighten all the f-clamps before the adhesive begins to cure. Fourth, as the f-clamps are tightened, the glue, epoxy, or other adhesive may be squeezed from between the pieces. This adhesive is, by nature, sticky and difficult to work with, and permanently hardens during the curing process. In this way, the screw threads on the f-clamps may get contaminated with the adhesive, rendering them inoperable and thus requiring recurring replacement costs. Fifth, there is also an increased risk of repetitive motion injuries due to the high number of clamps and the force required to tighten each clamp manually by hand. And finally, because the slab is finished-side-down during fabrication, the joint seam is not visible to the manufacturing operator unless that operator squats and looks up at the seam. This makes it extremely cumbersome and time consuming to apply and adjust the clamps to ensure a high-quality, strong and consistent joint.

What is therefore needed is a miter clamp that overcomes these deficiencies in the prior art.

4.0 SUMMARY

The present invention provides an elegant solution to the needs described above and provides numerous additional benefits and advantages, as will be apparent to persons of skill in the art. In one aspect, a clamp for securing a first miter-cut piece of material (e.g., the slab) to a second miter-cut piece of material (e.g., the drop skirt) is provided. The clamp includes a paddle, a position lock adjacent to the paddle, a channel structure connected to and extending away from the paddle at substantially an orthogonal direction, and a shaft assembly. The paddle has a non-slip surface where it contacts the first miter-cut piece and restricts the paddle from sliding when the clamp is in use. The paddle also includes a paddle hole. The position lock includes a position lock tab with a tab hole aligned with the paddle hole, and a spring that places force on the position lock tab such that the position lock tab is pushed away from the paddle. The channel structure includes a channel that is aligned with the paddle hole such that the channel, paddle hole and tab hole define a contiguous space. The shaft assembly is disposed at least partially in the contiguous space, and includes a shaft that travels through the paddle hole and the tab hole, a handle connected to the shaft, and a lower material-holding structure connected to the shaft. The clamp has at least two modes of operation: (1) a clamping mode where the force from a spring causes an edge of the tab hole to place pressure on the shaft and restrict movement of the shaft into the channel; and (2) a release mode where pushing the position lock tab towards the paddle relieves the pressure from the edge of the tab hole on the shaft, allowing movement of the shaft into the channel.

Various fine adjustment structures are provided. The shaft may also include a second spring that pushes the lower material holding structure away from the paddle, when the tab is depressed. The shaft may also include a sleeve with a central channel and a bolt within that channel and a bushing on either end or both ends of the sleeve. The position lock may also include a position lock channel that limits the movement of the position lock tab, and the position lock channel may be attached to the paddle. The position lock channel may also restrict the movement of the spring, and may include an overhang structure that contact the position lock tab and creates a pivot about which the position lock tab can rotate.

The paddle may be weighted so that it does not fall off the first piece of material (i.e., the slab) when the clamp is first placed on the first piece of material. The lower material holding structure may be wedge shaped and the non-slip material may be a sheet of material or a plurality of non-slip feet.

To use the clamp, a user places the non-slip surface of the clamp on the first miter-cut piece adjacent to the miter-cut edge of the first piece of material (i.e., the first miter-cut edge). The user then places the second miter-cut piece on top of the lower material holding structure, wherein the edge opposite to the miter-cut edge of the second piece (i.e., the second miter-cut edge) contacts the lower material holding structure. After applying adhesive to either the first miter-cut edge or the second miter-cut edge or to both the first and second miter-cut edges, the user pulls the handle away from the paddle, thereby bringing the first miter-cut edge into close proximity to the second miter-cut edge.

The user may also use the various fine adjustment structures to more precisely align the joint seam between the two pieces of material.

After the adhesive has set, the user may push the position lock tab towards the paddle thereby relieving the pressure from the edge of the tab hole on the shaft, and then move the shaft into the channel thereby moving the lower material holding structure away from the paddle. Then the user may remove the clamp from the first miter-cut piece. The movement of the shaft into the channel may be gravity assisted or assisted by a shaft spring—in other words, simply pressing the position lock tab may cause the shaft to move into the channel automatically.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

6.0 DETAILED DESCRIPTION

Following is a non-limiting written description of example embodiments illustrating various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

In the following description, numerous specific details are set forth in order to provide a thorough understanding of the present invention. Particular example embodiments of the present invention may be implemented without some or all of these features or specific details. In other instances, components well known to persons of skill in the art have not been described in detail in order not to obscure unnecessarily the present invention.

Figure 1:
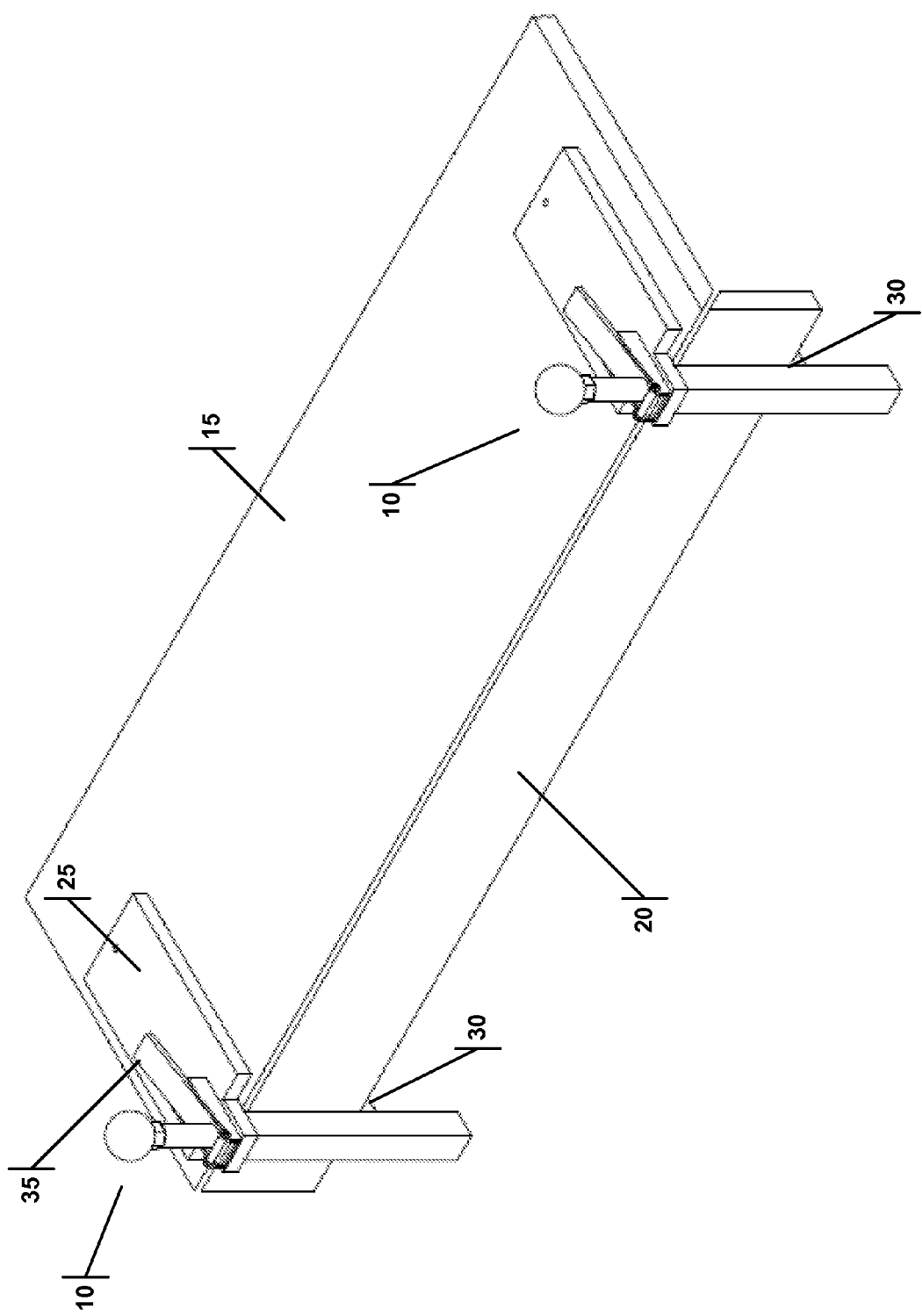
FIG. 1 is an isometric view of a pair of novel miter clamps used to join two miter-cut pieces of material.

Referring to FIG. 1, the miter clamp 10 is used to join a first miter-cut piece of material 15 (the slab) to a second miter-cut piece of material 20 (the drop skirt). The miter clamp 10 contains a paddle 25 that lays on top of the slab 15. The paddle has a non-slip surface (shown in FIG. 4) that prevents the miter clamp 10 from sliding off of the slab 15. When joining the drop skirt 20 to the slab 15, the user of the miter clamp 10 can lay the paddle 25 of the miter clamp 10 on the slab 15, and lay a second miter clamp 10 on the slab 15, and thereafter can place the drop skirt 20 onto the lower material holding structure 30 of the miter clamps 15. The user can then apply adhesive to the miter-cut edge of either the slab 15 or drop skirt 20 (or both) and clamp the miter clamps 10 to join the slab 15 to the drop skirt 20. Once the adhesive sets, the user can depress the position lock tab 35 of the clamp 10, lowering the lower material holding structure 30 away from the drop skirt 20, and then remove the clamp 10.

A single user can join the miter cuts easily without having to flip the slab to the finished-side-down orientation, thereby reducing the risks associated with overly handling the material.

The user also can view and inspect the joint seam easily, without having to squat. This allows the user to adjust the clamps and inspect the joint seam simultaneously, resulting in a faster and more precise joint seam.

Figure 2:
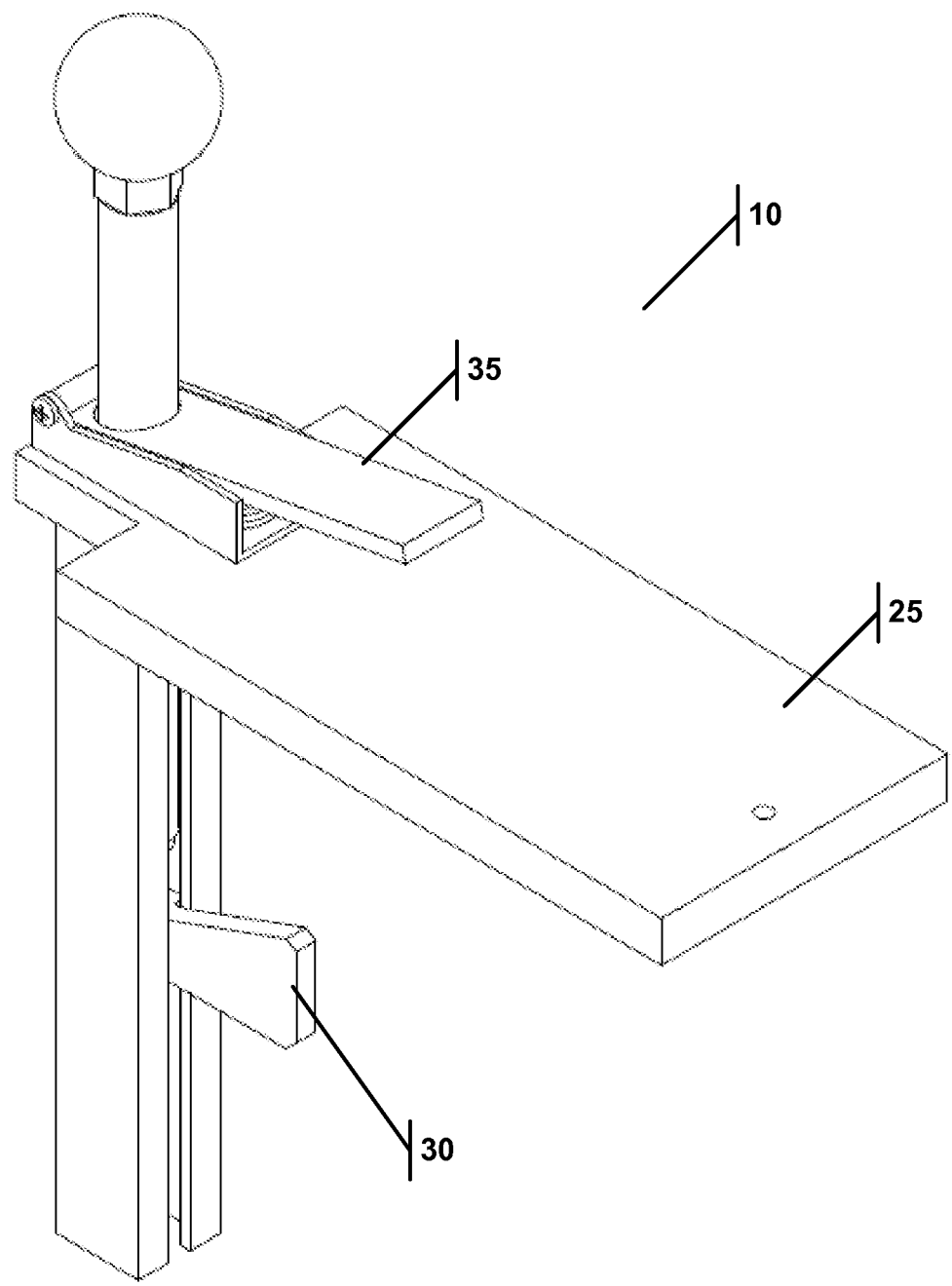
FIG. 2 is an isometric view of a novel miter clamp.
Figure 3:
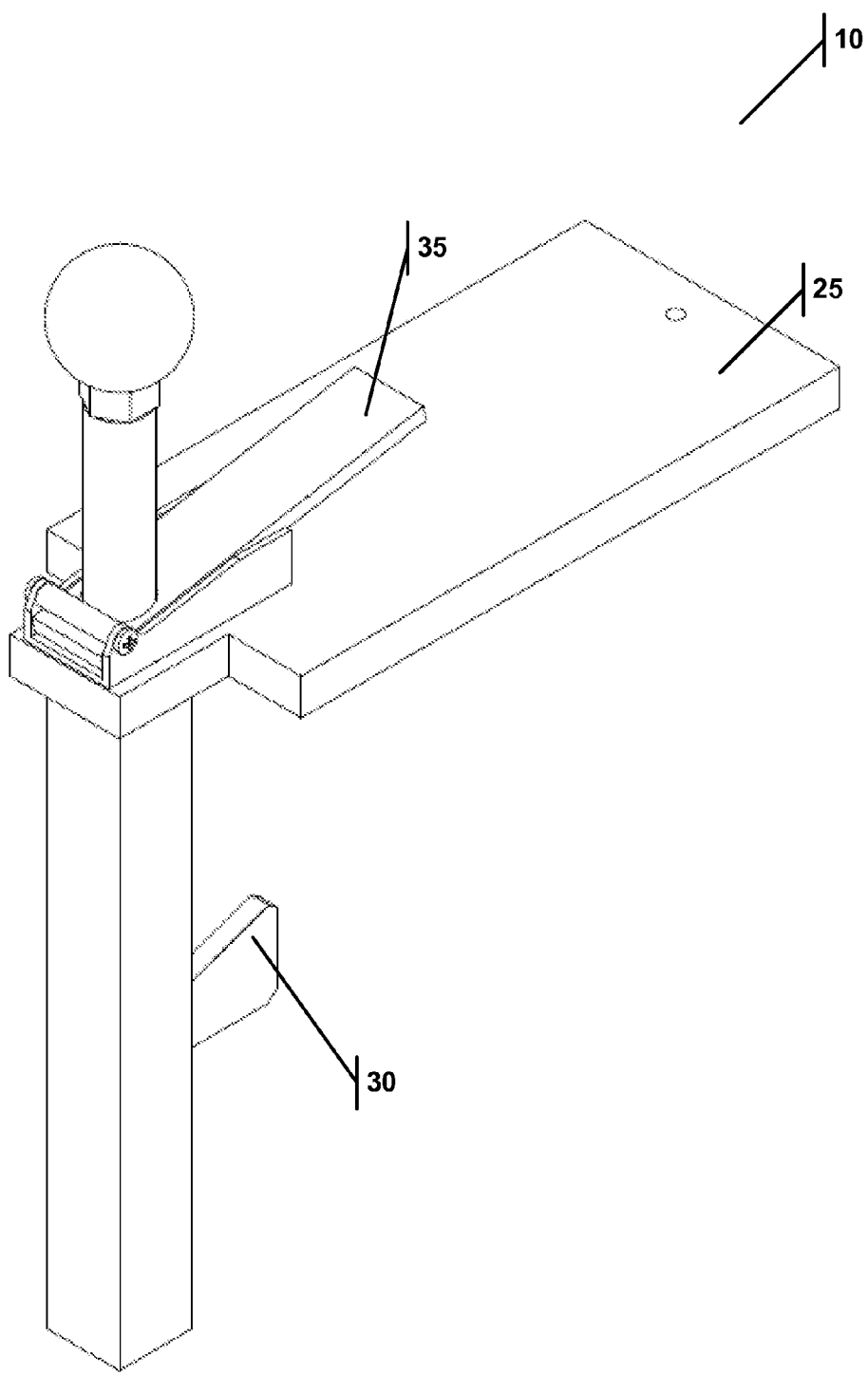
FIG. 3 is an isometric view of the novel miter clamp.
Figure 4:
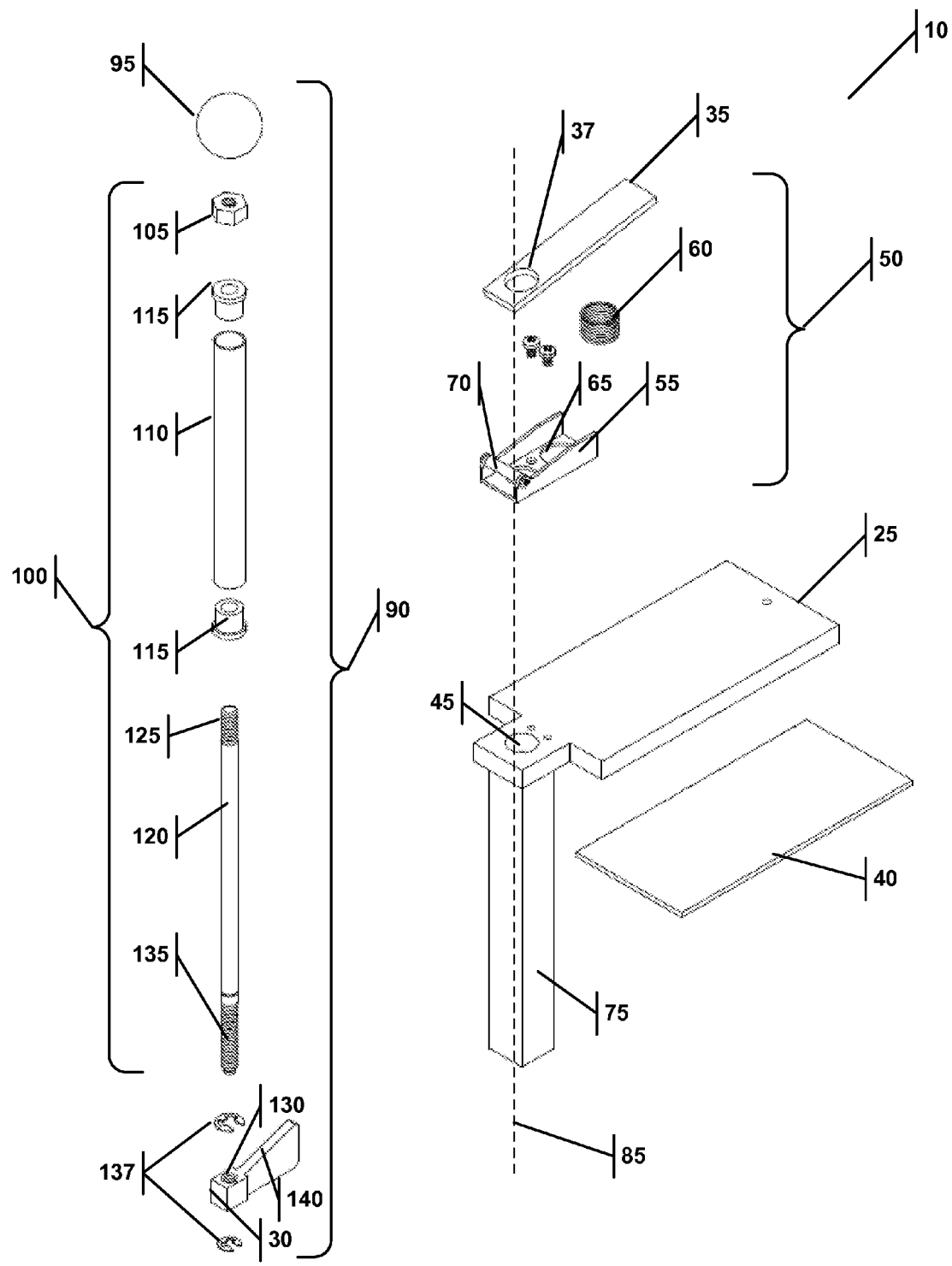
FIG. 4 is an exploded isometric view of a novel miter clamp.
Figure 5:
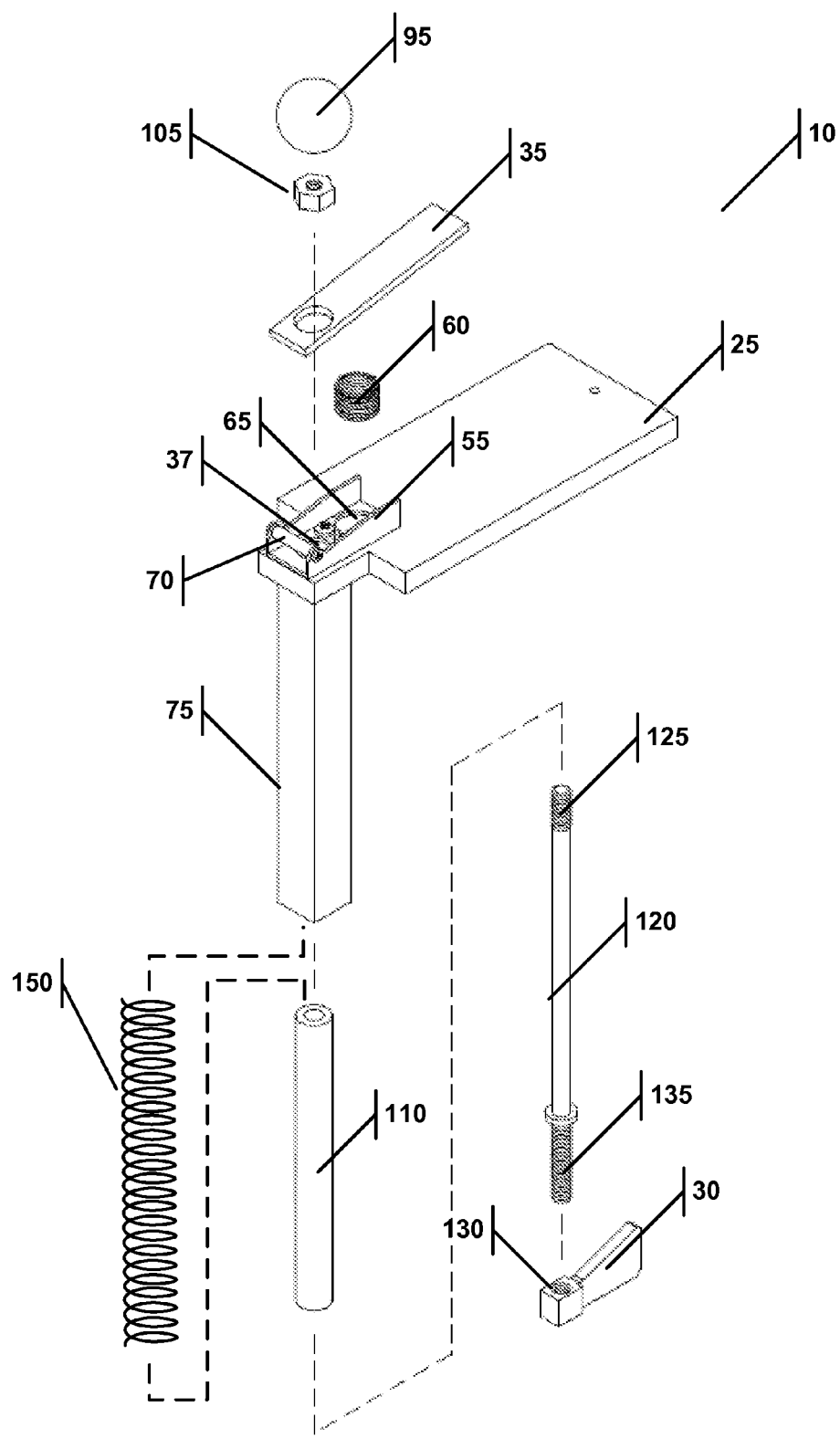
FIG. 5 is an exploded isometric view of the novel miter clamp.
Figure 6:
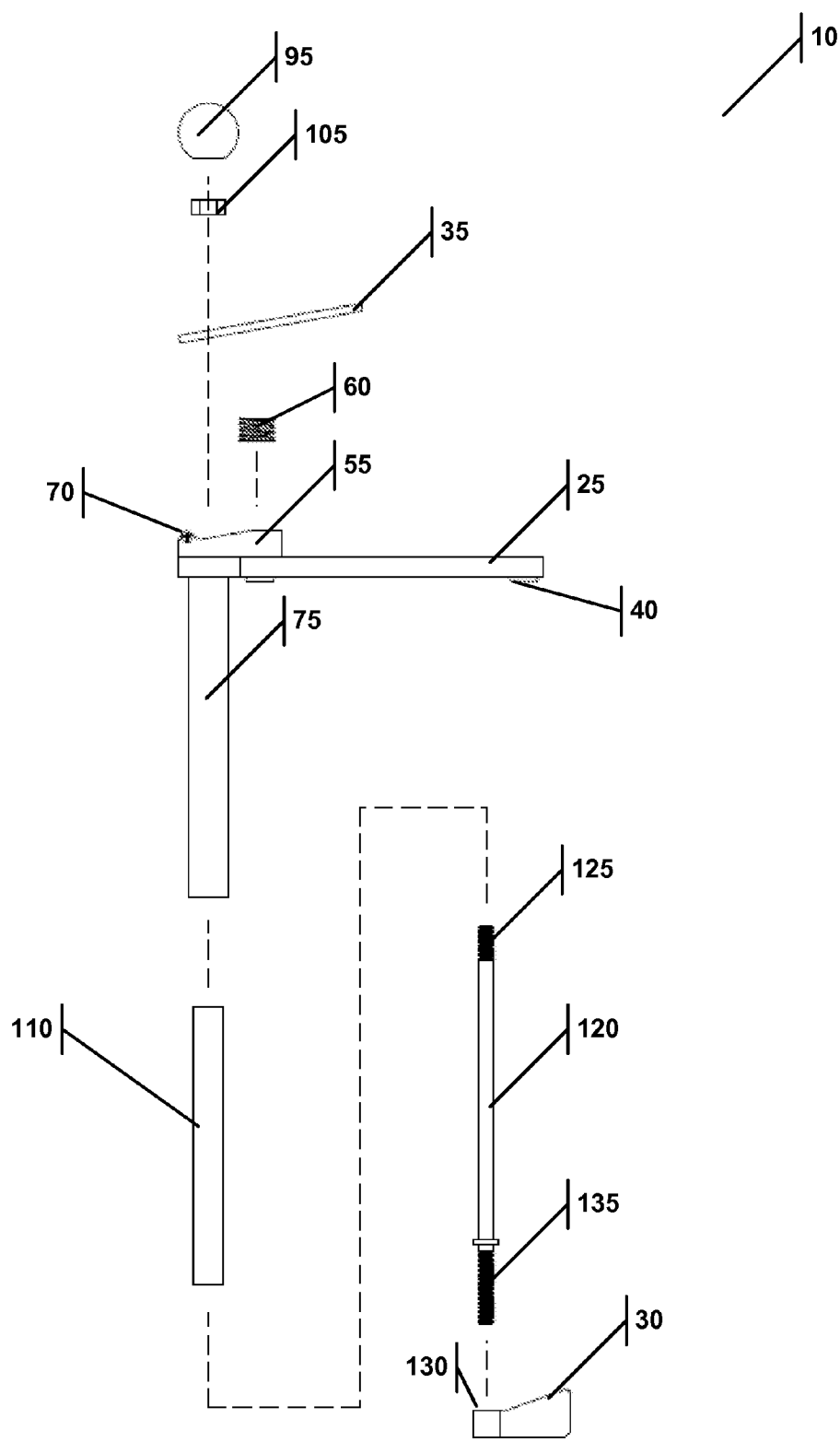
FIG. 6 is an exploded side view of the novel miter clamp.
Figure 13:
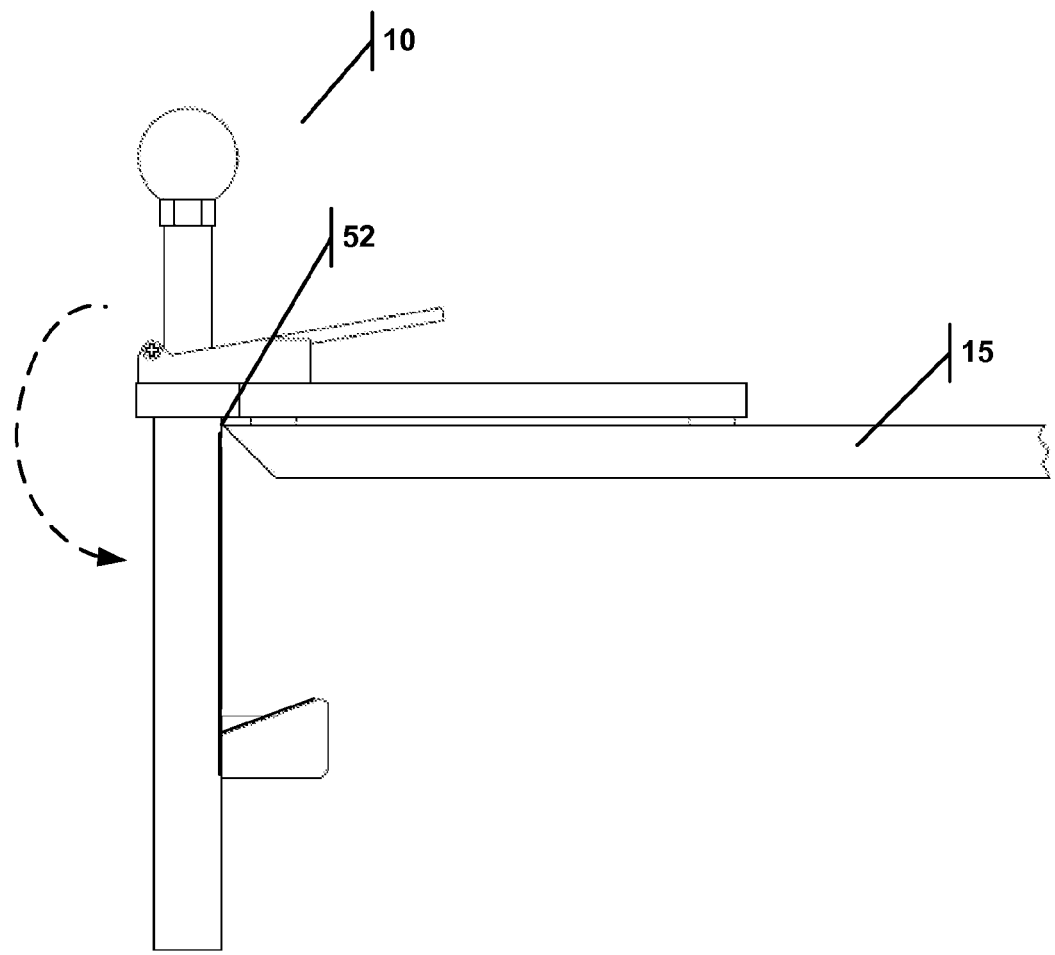
FIG. 13 is a side view of the novel miter clamp placed on a slab.

FIGS. 2 and 3 show two different isometric views of the clamp 10, while FIGS. 4, 5 and 6 present exploded views of the various parts of the clamp 10. The paddle 25 of the clamp has a non-slip surface 40 that prevents the movement of the clamp 10 when the clamp is placed on the slab 15. The non-slip surface 40 may be a sheet (FIG. 8) or a plurality of non-slip feet (FIG. 9). Because the miter clamp 10 is "L" shaped, unless is it properly weighted the clamp 10 will pivot about point 52 and fall off the slab 15 (FIG. 13). Preferably the paddle 25 is weighted so as to prevent rotation of the miter clamp 10 about the pivot 52. This allows a single user to set up the various clamps 10 needed for the project first, then slide the drop skirt 20 onto the lower material holding structure 30. The paddle 25 also has a paddle hole 45. Adjacent to the paddle hole is a position lock 50 that may have various components. Those components may include a position lock tab 35 that contains a tab hole 37 that aligns with the paddle hole 45, and a position lock channel 55 that restricts the movement of the position lock tab 35. A spring 60 places force on the position lock tab 35, pushing the tab 35 away from the paddle 25. The position lock channel 55 may have a structure 65 that holds the spring 60 in place. As shown in FIG. 4, the structure 65 is a hole, but when the position lock channel 55 is attached to the paddle 25 as shown in FIG. 5, the paddle 25 in conjunction with the structure 65 forms a divot that holds the spring 60 in place. The structure 65 may also be a bump over which the spring 60 fits. The position lock channel 55 may also have an overhang structure 70 under which the position lock tab 35 fits, thereby creating a pivot 72 (shown in FIG. 7) about which the position lock tab 35 can rotate. This is shown as sweep arrow 74 in FIG. 7.

Returning to FIGS. 4, 5 and 6, extending away from the paddle 25 in a generally orthogonal direction is the channel structure 75 that includes a channel wherein the channel 80 (see FIG. 8) is aligned with the paddle hole 25 and the tab hole 37. This alignment is shown by dashed line 85.

Within a portion of the channel 80 is the shaft assembly 90, which has three main parts: the handle 95, the shaft 100, and the lower material holding structure 30. The shaft may optionally include a nut 105 used for fine adjustment, a sleeve 110, a pair of bushings 115 and a threaded bolt 120. The shaft may include the sleeve 110 and pair of bushings 115 so as to lessen the diameter of the threaded bolt 120 and thereby reduce the overall weight of the clamp 10. The bushing 115 are optional, and when the clamp 10 includes a sleeve 110, it need not also have bushings. The sleeve 110 may have very tight tolerances such that the bolt 120 fits within the sleeve 110 with very little lateral play. The sleeve 110 may also assist in the fine adjustment of the clamp 10 as discussed below.

Figure 7:
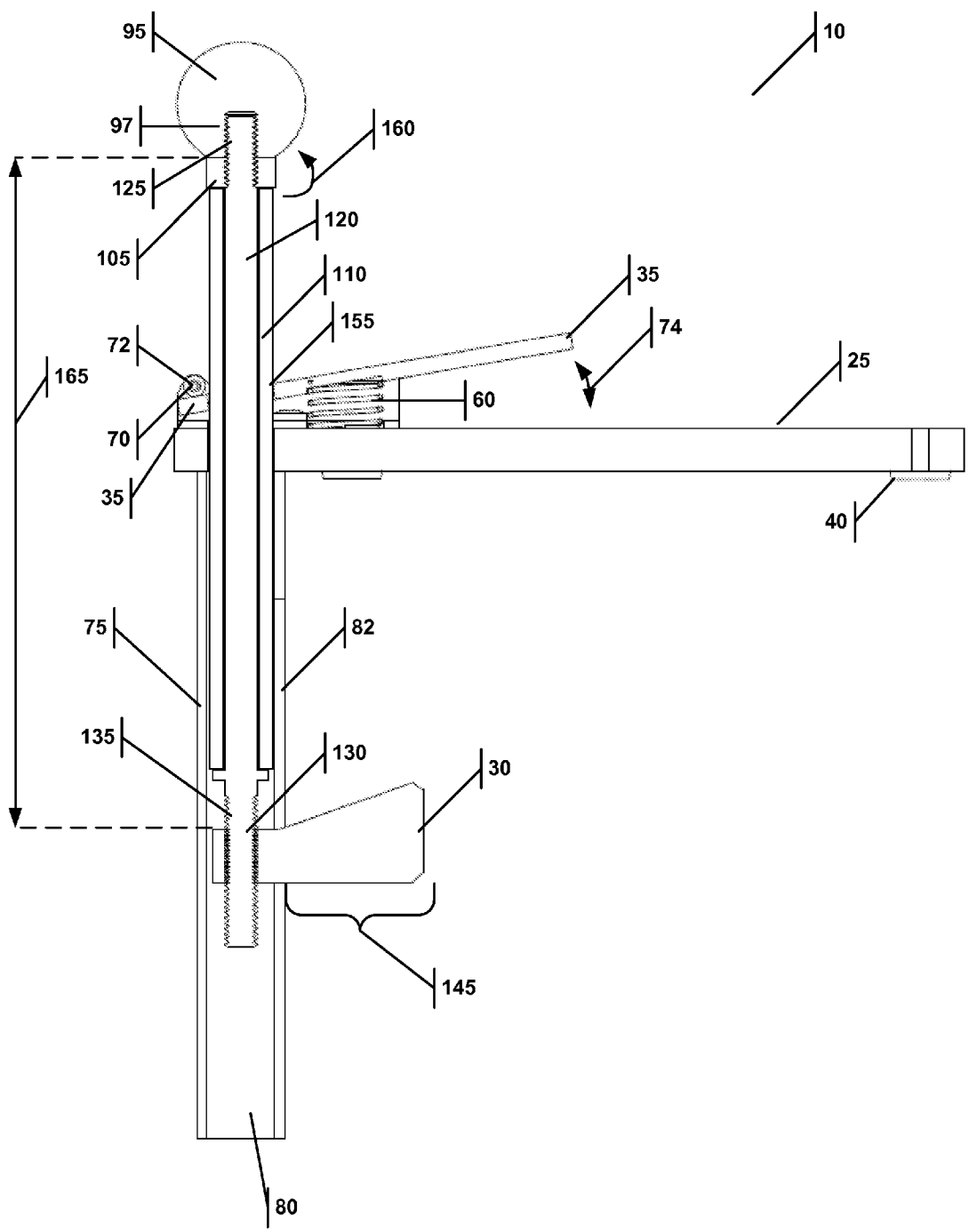
FIG. 7 is a cross-sectional side view of the novel miter clamp.

The handle 95 may be threaded 97 (see FIG. 7) and connect to the threaded bolt 120 by threads 125. Likewise the lower material holding structure 30 may have a threaded hole 130 that connects to the bolt 120 by threads 135, and may have clips 137 to ensure that the lower material holding structure 30 stays connected to the threaded bolt 120. A portion 145 of the lower holding structure 130 is outside of the channel 80 as shown in FIG. 7. The shape of the lower holding structure 130 may be that of a wedge 140, which helps maintain the drop skirt in place by allowing it to slide along the wedge 140 and rest against the channel structure 75 (see e.g. FIG. 14). The shaft assembly 90 may also include a shaft spring 150 that pushes the lower material holding structure 30 away from the paddle 25. The shaft spring 150 is of a sufficiently large diameter so that it surrounds the sleeve and cannot exit through the paddle hole 45 or the tab hole 37. The top of the shaft spring 150 may contact adjacent to the paddle hole 45 and the bottom contacts the lower material holding structure 30.

As shown in FIG. 7, when assembled, the edge 155 of the tab hole 37 contacts the sleeve 110 because the force from the spring 60 pushes the edge of the position lock tab 35 away from the paddle 25. This contact is of sufficient force to substantially restricting movement of the shaft 100 into the channel 80. To further restrict movement, the sleeve 110 may be rough or contain teeth to provide the edge 155 with a better grip. This is called the clamping mode.

When the position lock tab 35 is depressed (i.e., pushed towards the paddle 25), the pressure exerted on the sleeve 110 by the edge 155 of the tab hole 37 is relieved, allowing movement of the shaft 100 into the channel 80. In operation, the movement of the shaft 100 into the channel 80 may be accomplished by gravity or by the shaft spring 150. This is called the release mode.

In operation, the user first places the miter clamp 10 on the slab 15 by contacting the non-slip surface 40 to the surface of the slab 15, with the channel structure 75 adjacent to the miter-cut edge of the slab 15. Then the drop skirt 20 is placed on the lower material holding structure 30, with the side opposite to the miter cut edge contacting the lower material holding structure 30. The user then applies adhesive to the miter-cut edges and pulls the handle 95 away from the paddle 25, thereby bringing the miter-cut edge of the slab 15 into close proximity to the miter-cut edge of the drop skirt 20. At this point the user inspects the joint seam and may use the fine adjustment mode of the clamp 10 (discussed below) to ensure a precise seam. After the seam meets inspection, the clamp 10 remains installed until the adhesive sets, at which point the user may depress the position lock tab thereby relieving the pressure from the edge 155 of the tab hole 37 on the sleeve 110 and moving the shaft 100 into the channel 80. This action moves the lower material holding structure 30 away from the paddle 25 and away from the drop skirt 20, such that the user can safely remove the clamp 10 from the slab 15.

Referring to FIG. 7, the fine adjustment mode of the clamp 10 will be discussed. Once a user brings the two miter-cut pieces into close proximity by pulling up on the handle 95, the user may use the fine adjustment to accurately and gently move the drop skirt 20 into its final position. The fine adjustment is accomplished by the threading on the bolt 120. For example, the handle 95 may be rotated about arrow 160 thus changing the distance 165 between the handle 95 and the lower material-holding structure 30. In this embodiment, the lower material-holding structure 30 may actually be an integral part of the threaded bolt 120, so there would be no need for the lower threads 135 or the threaded hole 130. The sleeve 110 further assists with the fine adjustment because it allows the threaded bolt 120 to slide into and out of the channel 80 without affecting the pressure the edge 155 of the tab hole 37 imparts on the shaft assembly 90. Similarly, the optional nut 105 can be rotated about arrow 160, also changing the distance 165.

In an alternate embodiment, the shaft assembly 90 may be constructed to transfer rotational movement of the handle 95 to the lower threaded portion of the bolt 135. Because the channel 80 has a slot 82 that restricts the lower material holding structure 30 from rotating (shown in detail in FIG. 8), the threaded hole 130 transforms the rotational movement into translational movement of the lower material holding structure 30 along the channel 81, thereby changing the distance 165. In this embodiment, the sleeve 110 also assists with the fine adjustment by allowing the threaded bolt 120 to slide into and out of the channel 80 without affecting the pressure the edge 155 of the tab hole 37 imparts on the shaft assembly 90.

Figure 8:
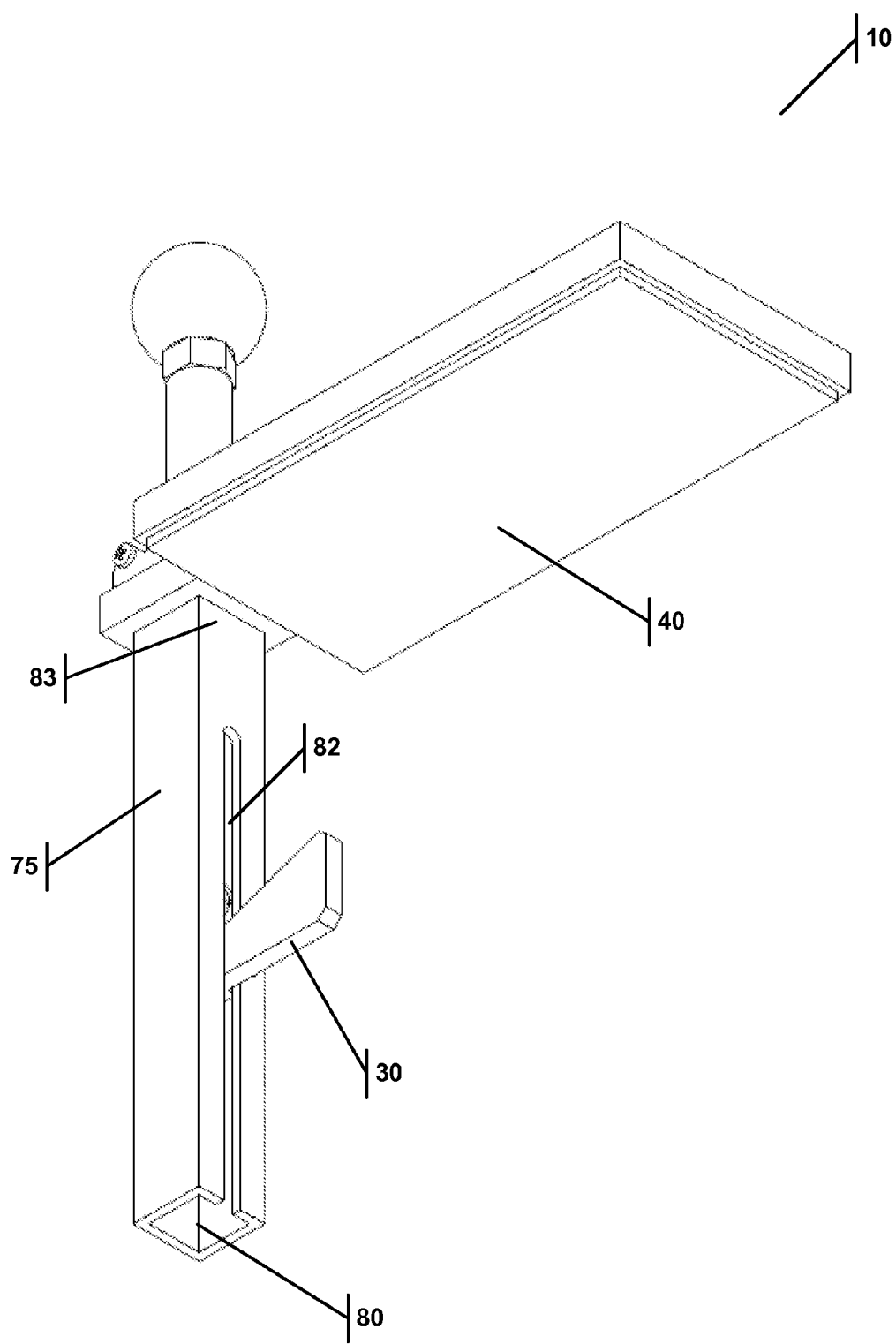
FIG. 8 is an upward isometric view of the novel miter clamp with a sheet of non-slip material.
Figure 9:
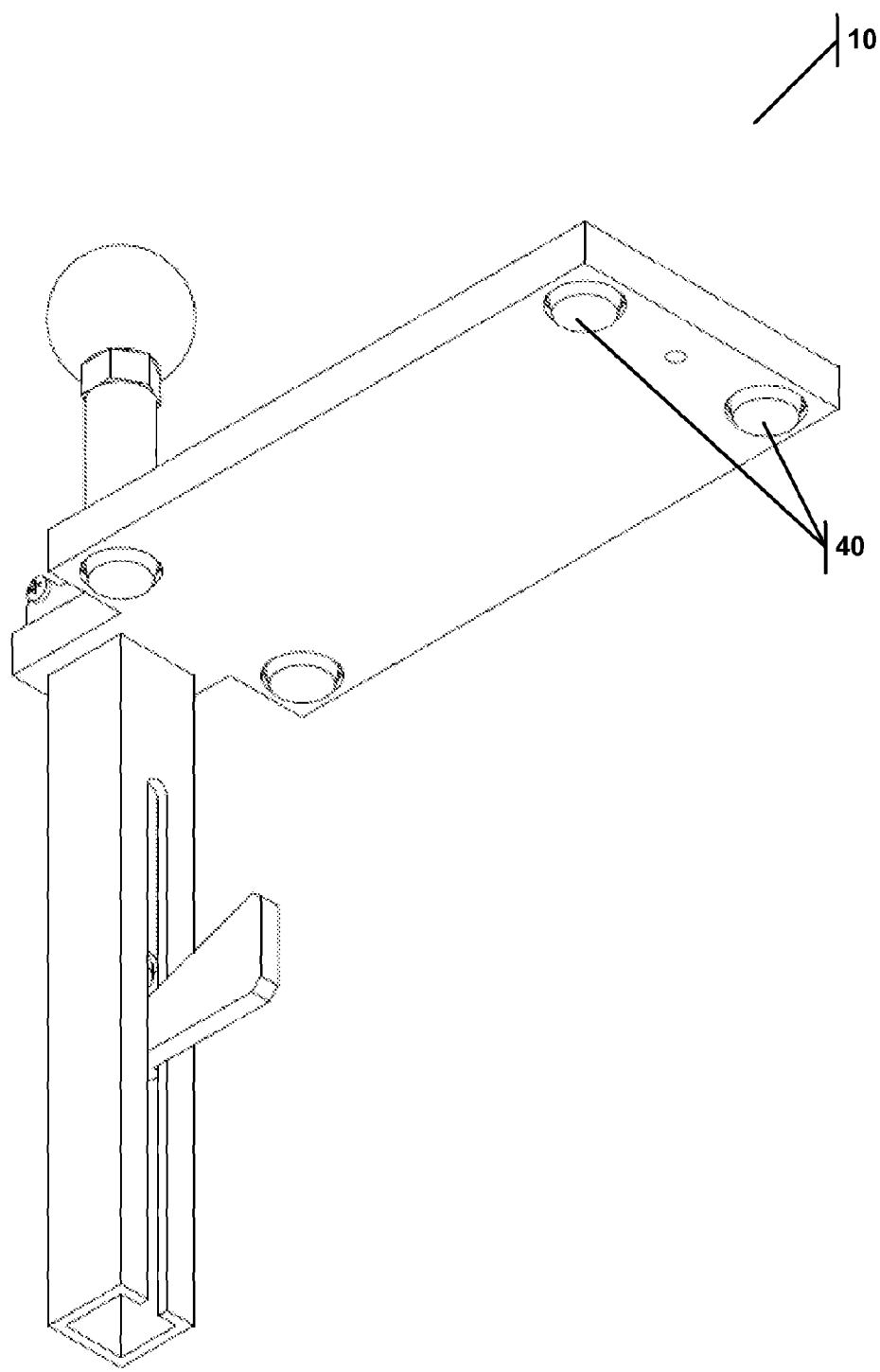
FIG. 9 is an upward isometric view of the novel miter clamp with a plurality of non-slip feet.
Figure 10:
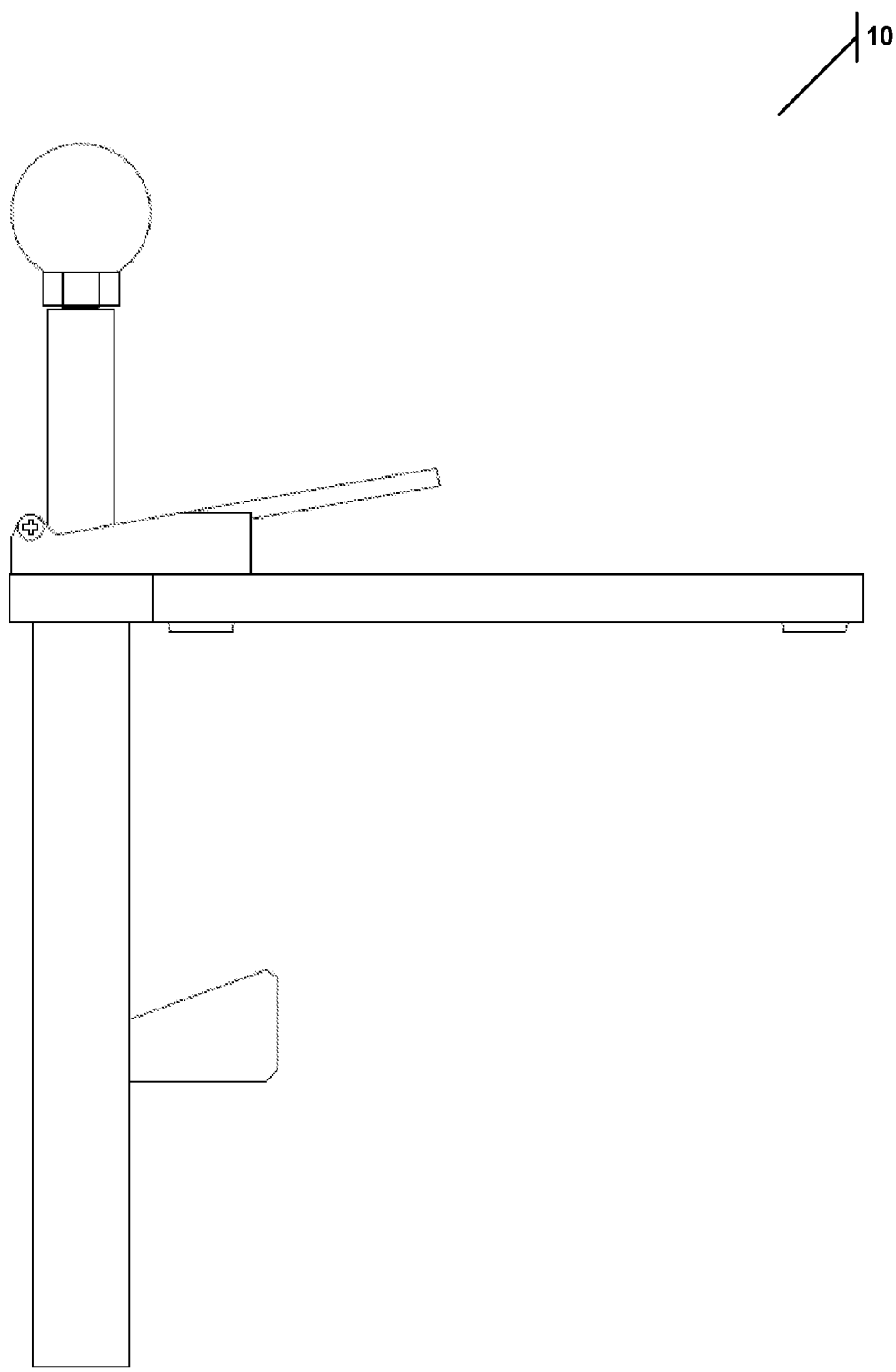
FIG. 10 is a side view of the novel miter clamp.
Figure 11:
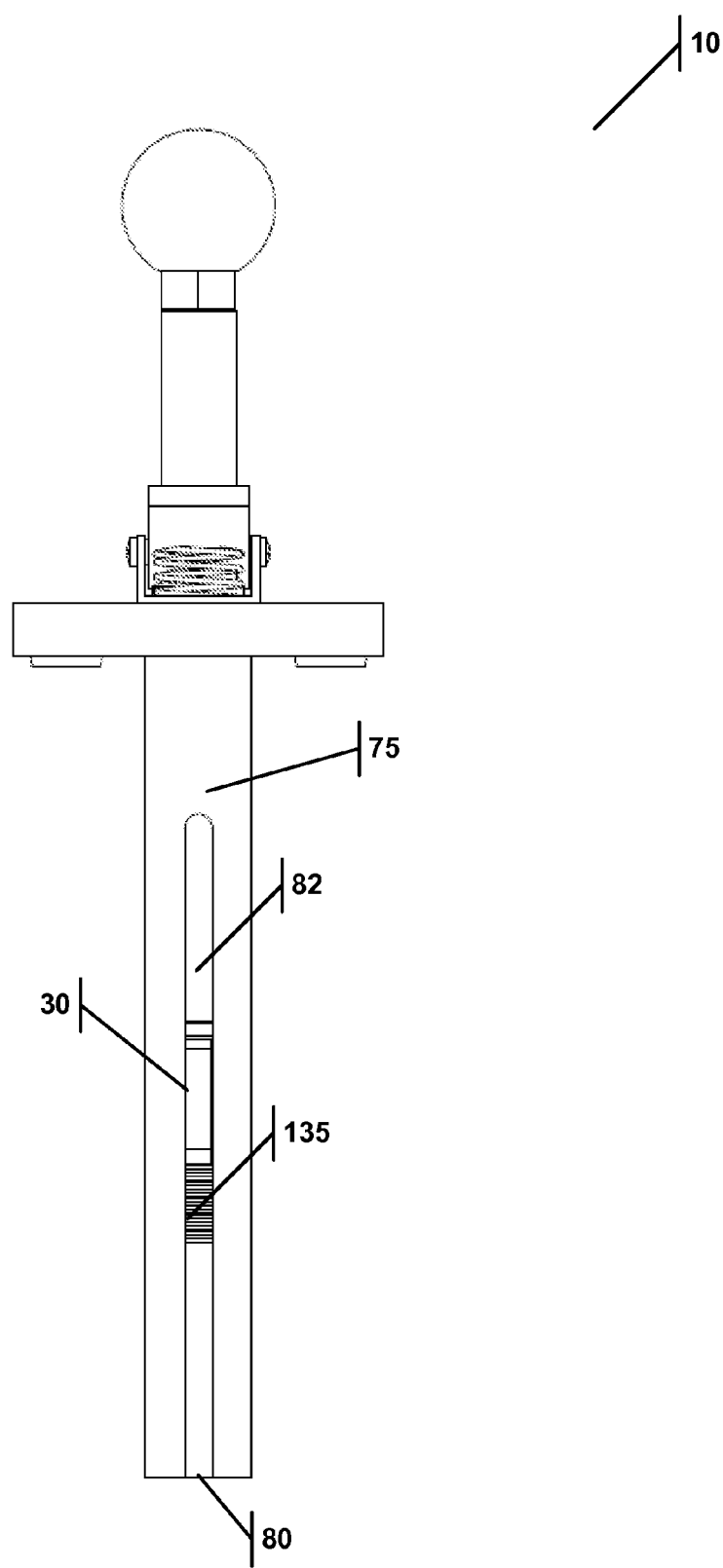
FIG. 11 is a front view of the novel miter clamp.
Figure 12:
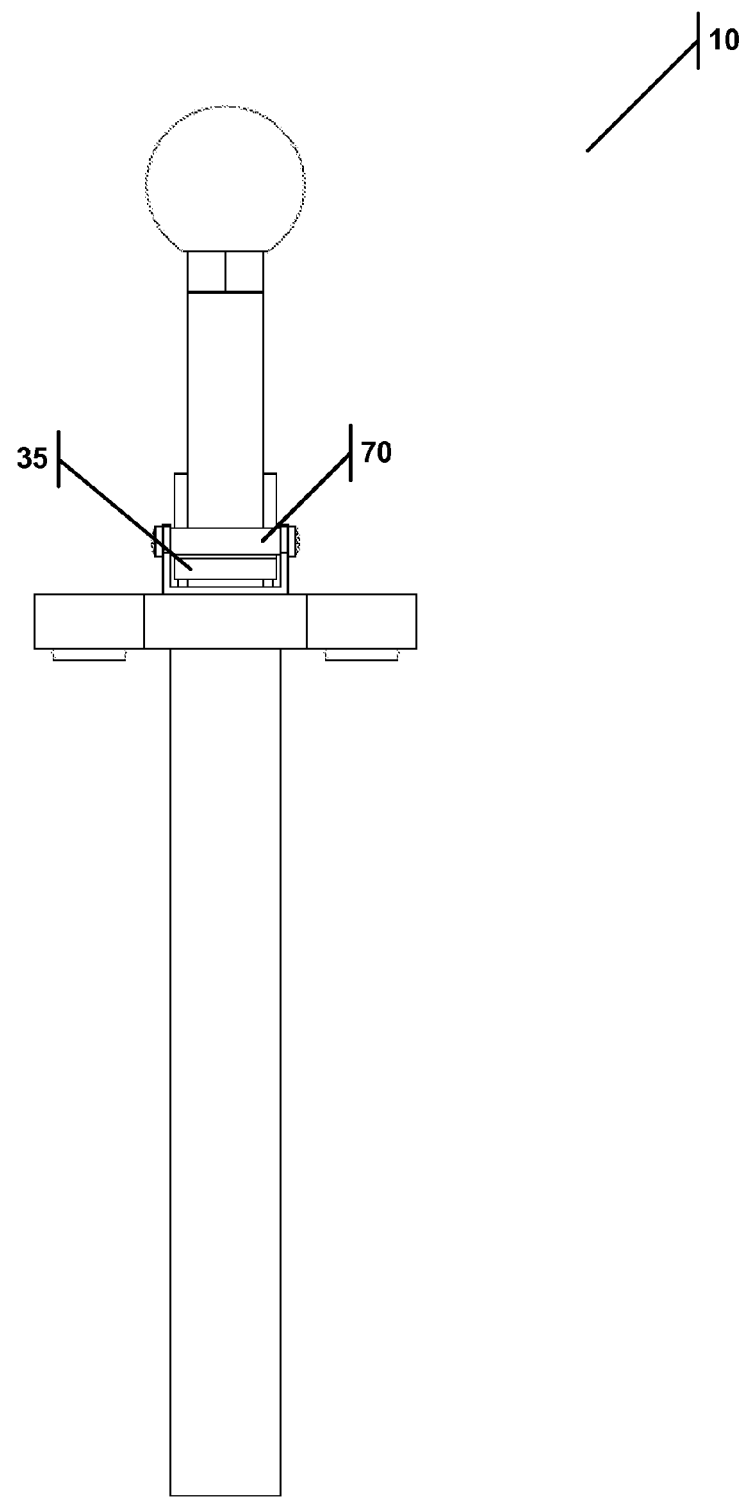
FIG. 12 is a back view of the novel miter clamp.

FIG. 8 illustrates in more detail the various functions of the slot 82. First, it prevents the rotation of the lower material holding structure 30, thereby maintaining a more stable mount for the drop skirt 20 when the clamp 10 is in use. Second, because the slot does not continue up to the paddle 25, the adhesive that is squeezed out of the joint seam would not enter into the mechanical works of the clamp 10. The adhesive would likely contact the clamp 10 at position 83, and can easily be cleaned.

Figure 14:
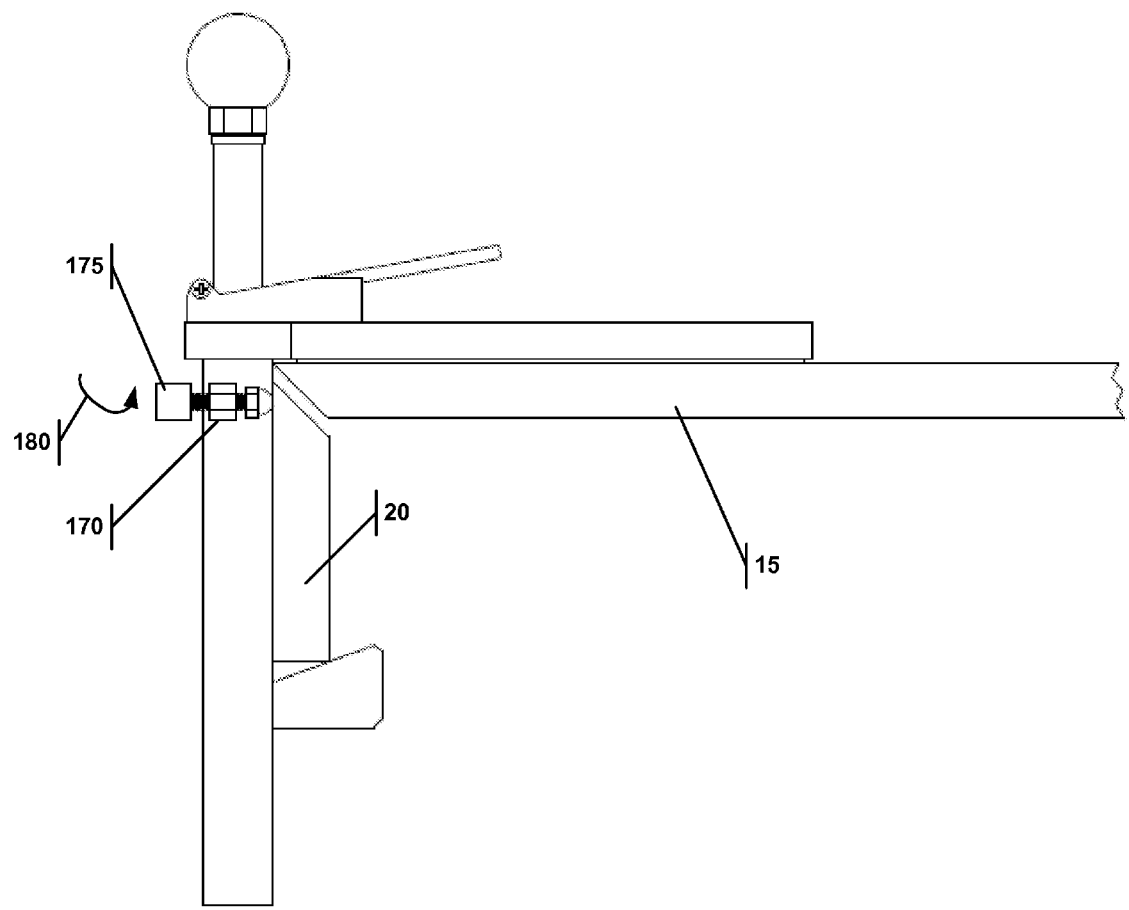
FIG. 14 is a side view of the novel miter clamp used to join two miter-cut pieces of material, where the clamp has an optional fine tune adjustment for placing horizontal pressure on one of the pieces of material.
Figure 15:
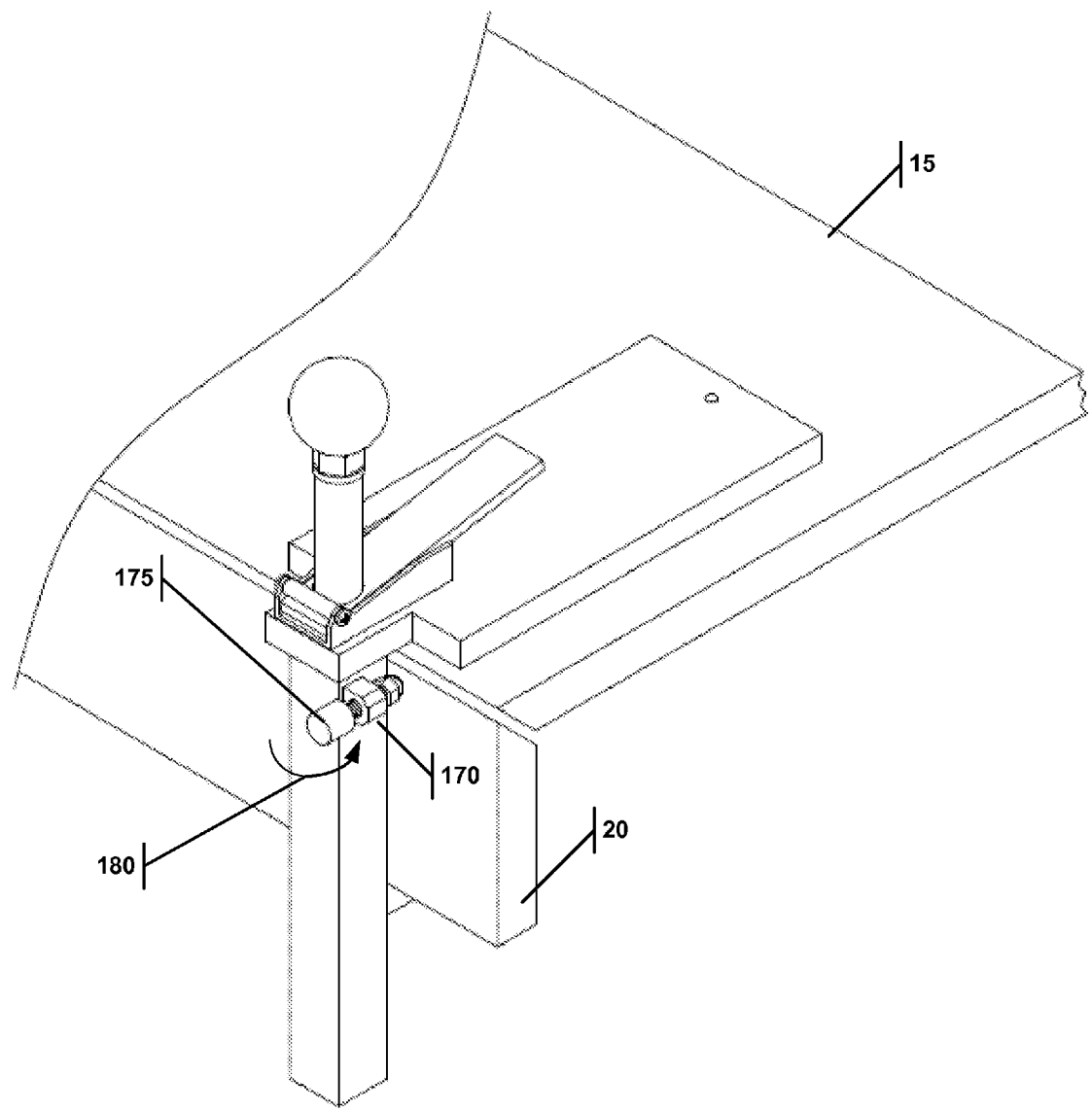
FIG. 15 is an isometric view of the novel miter clamps used to join two miter-cut pieces of material, where the clamp has an optional fine tune adjustment for placing horizontal pressure on one of the pieces of material.

Turning to FIGS. 14 and 15, yet another fine adjustment mode is shown. Specifically, the channel structure 75 may include a threaded hole 170 and a threaded shaft 175 disposed in the threaded hole 170. The end of the threaded shaft 175 contacts the drop skirt 20. Rotating about arrow 180, the threaded shaft 175 places pressure on the drop skirt 20, pushing the drop skirt 20 horizontally towards the slab 15 and closing the seam.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A clamp for securing a first miter-cut piece of material to a second miter-cut piece of material, the clamp comprising:
    a paddle comprising a paddle hole, the paddle defining a plane;
    a position lock adjacent to the paddle, the position lock comprising:
        a position lock tab with a tab hole; wherein the tab hole aligns with the paddle hole; and
        a spring adapted to place force on the position lock tab such that the position lock tab is pushed away from the plane;
    a channel structure connected to and extending away from the paddle at substantially an orthogonal direction, the channel structure comprises a channel wherein the channel is aligned with the paddle hole such that the channel, paddle hole and tab hole define a contiguous space;
    a shaft assembly disposed at least partially in the contiguous space, the shaft assembly comprising:
        a shaft that travels through the paddle hole and the tab hole;
        a handle connected to the shaft; and
        a lower material holding structure connected to the shaft, wherein a portion of the lower material holding structure is disposed of in the channel and a portion is outside of the channel;
    wherein the clamp comprises two modes:
        a clamping mode wherein the force from the spring causes an edge of the tab hole to place pressure on the shaft and restricts movement of the shaft into the channel; and
        a release mode wherein pushing the position lock tab towards the plane relieves the pressure from the edge of the tab hole on the shaft, allowing movement of the shaft into the channel.

2. The clamp of claim 1, wherein:
    the shaft further comprises:
        a sleeve with a central channel, wherein the sleeve receives the pressure from the edge of the tab hole when the clamp is in the clamping mode; and
        a bolt disposed of in the central channel, wherein the bolt is at least partially threaded; and
    the lower material holding structure further comprises a threaded hole that is threaded onto the bolt, wherein the lower material holding structure is separated from the handle by a distance;
    wherein the shaft assembly is adapted to transfer rotational movement of the handle to the threaded portion of the bolt, and wherein the channel structure restricts the lower material holding structure from rotating; and
    the clamp comprising a third fine-adjustment clamping mode, wherein the threaded hole transforms the rotational movement of the threaded portion of the bolt into translational movement of the lower material holding structure along the channel thereby changing the distance.

3. The clamp of claim 1, wherein:
    the shaft further comprises:
        a sleeve with a central channel, wherein the sleeve receives the pressure from the edge of the tab hole when the clamp is in the clamping mode;
        a bolt disposed in the central channel, wherein the bolt is at least partially threaded; and
        a nut threaded onto the bolt adjacent to the handle and contacting the sleeve; wherein the lower material holding structure is separated from the handle by a distance; and
    the clamp comprise a third fine-adjustment clamping mode, wherein rotating the nut changes the distance.

4. The clamp of claim 1, further comprising:
    a threaded hole;
    a threaded shaft disposed in the threaded hole; and
    a third fine-adjustment clamping mode, wherein the threaded hole transforms the rotational movement of the threaded shaft into translational movement of the second miter-cut piece of material.

5. The clamp of claim 1, wherein:
    the shaft further comprises:
        a sleeve with a central channel, wherein the sleeve receives the pressure from the edge of the tab hole when the clamp is in the clamping mode;
        a bolt disposed of in the central channel, wherein the bolt is at least partially threaded; and
    the handle further comprises a threaded hole that is threaded onto the bolt, wherein the lower material holding structure is separated from the handle by a distance; and
    the clamp comprises a third fine-adjustment clamping mode, wherein rotating the handle causes the threaded hole to rotate and changes the distance.

6. The clamp of claim 1, wherein the shaft further comprises:
    a sleeve with a central channel, wherein the sleeve receives the pressure from the edge of the tab hole when the clamp is in the clamping mode; and
    a bolt disposed in the central channel.

7. The clamp of claim 1, wherein the paddle further comprises a non-slip surface that contacts the first miter-cut piece and substantially restricts the paddle from sliding when the clamp is in use.

8. The clamp of claim 1, wherein the position lock further comprises a position lock channel; wherein the position lock tab is disposed of in the position lock channel and limits the movement of the position lock tab.

9. The clamp of claim 8, wherein the position lock channel further comprises a structure to restrict the movement of the spring.

10. The clamp of claim 8, wherein the position lock channel further comprises an overhang structure in contact with the position lock tab, the overhang structure creating a pivot about which the position lock tab can rotate.

11. The clamp of claim 7, wherein the paddle is weighted so as to prevent rotation of the clamp away from the first miter-cut piece.

12. The clamp of claim 1, wherein the lower material holding structure is wedge shaped.

13. The clamp of claim 7, wherein the non-slip surface comprises a sheet of non-slip material or a plurality of non-slip feet.

14. The clamp of claim 1, wherein the shaft assembly comprises a shaft spring adapted to push the lower material holding structure away from the plane when the position lock tab is pushed towards the plane.

15. A method of attaching a first miter-cut piece of material have a first miter-cut edge to a second miter-cut piece of material having a second miter-cut edge, the method comprising:
providing a clamp, wherein the clamp comprises:
a paddle comprising a paddle hole, the paddle defining a plane;
a position lock adjacent to the paddle, the position lock comprising:
a position lock tab with a tab hole; wherein the tab hole aligns with the paddle hole; and
a spring adapted to place force on the position lock tab such that the position lock tab is pushed away from the plane;
a channel structure connected to and extending away from the paddle at substantially an orthogonal direction, the channel structure comprises a channel wherein the channel is aligned with the paddle hole such that the channel, the paddle hole and the tab hole define a contiguous space;
a lower assembly disposed at least partially in the contiguous space, the lower assembly comprising:
a shaft that travels through the paddle hole and the tab hole, wherein the force from the spring cause an edge of the tab hole to place pressure on the shaft and substantially restrict movement of the shaft into the channel;
a handle connected to the shaft; and
a lower material holding structure connected to the shaft, wherein a portion of the lower material holding structure is disposed in the channel and a portion is outside of the channel;
placing the paddle on the first miter-cut piece adjacent to the first miter-cut edge;
placing the second miter-cut piece on top of the lower material holding structure, wherein the edge opposite to the second miter-cut edge contacts the lower material holding structure;
applying adhesive to either the first miter-cut edge or the second miter-cut edge or to both the first and second miter-cut edges;
pulling on the handle away from the paddle, thereby bringing the first miter-cut edge into close proximity to the second miter-cut edge.

16. A method of claim 15, wherein:
the shaft further comprises:
a sleeve with a central channel, wherein the sleeve receives the pressure from the edge of the tab hole; and
a bolt disposed in the central channel, wherein the bolt is at least partially threaded; and
the handle further comprises a threaded hole that is threaded onto the bolt, wherein the lower material holding structure is separated from the handle by a distance; and
wherein the method comprises rotating the handle to bring the first miter-cut edge into contact with the second miter-cut edge.

17. A method of claim 15, wherein:
the shaft further comprises:
a sleeve with a central channel, wherein the sleeve receives the pressure from the edge of the tab hole; and
a bolt disposed of in the central channel, wherein the bolt is at least partially threaded; and
the lower material holding structure further comprises a threaded hole that is threaded onto the bolt;
wherein the lower assembly is adapted to transfer rotational movement of the handle to the threaded portion of the bolt, and wherein the channel structure restricts the lower material holding structure from rotating such that the threaded hole transforms the rotational movement of the threaded portion of the bolt into translational movement of the lower material holding structure along the channel;
wherein the method comprises rotating the handle to bring the first miter-cut edge into contact with the second miter-cut edge.

18. A method of claim 15, wherein the clamp further comprises:
a threaded hole;
a threaded shaft disposed in the threaded hole, wherein the threaded hole transforms the rotational movement of the threaded shaft into translational movement of the second miter-cut piece of material; and
wherein the method comprises rotating the threaded shaft to bring the first miter-cut edge closer to the second miter-cut edge.

19. A method of claim 15, further comprising:
allowing the adhesive to set;
pushing the position lock tab towards the plane thereby relieving the pressure from the edge of the tab hole on the shaft;
moving the shaft into the channel thereby moving the lower material holding structure away from the plane; and
removing the clamp from the first miter-cut piece.

20. The method of claim 19, wherein: the shaft further comprises a shaft spring adapted to push the lower material holding structure away from the plane when the position lock tab is pushed towards the plane; and wherein the movement of the shaft into the channel is caused by the shaft spring.

* * * * *